Patented Oct. 21, 1930

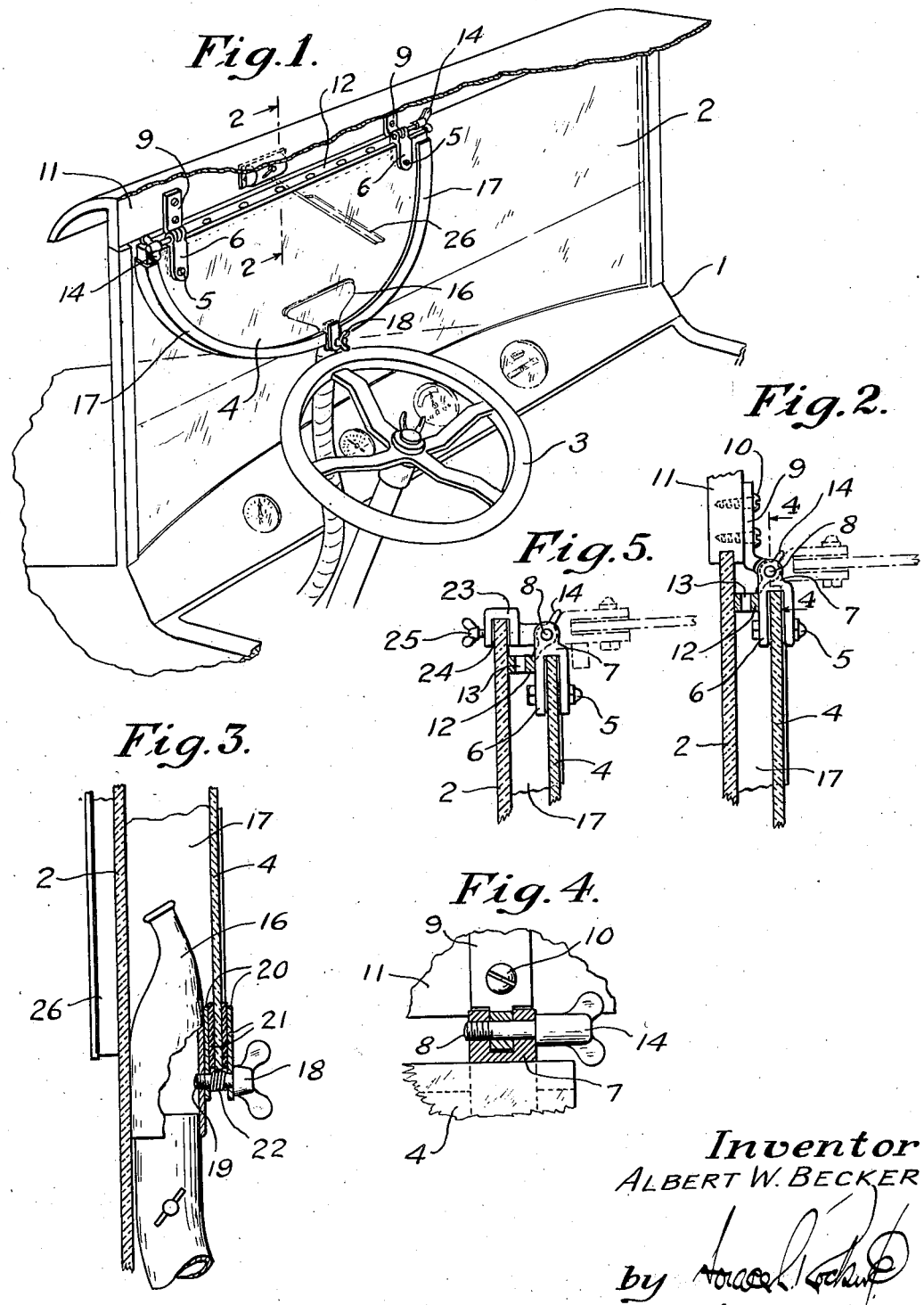

1,778,882

UNITED STATES PATENT OFFICE

ALBERT WILLIAM BECKER, OF HARTFORD, CONNECTICUT

GLASS-CLEARING DEVICE

Application filed August 1, 1927. Serial No. 209,945.

My invention relates to glass clearing devices.

It has for its object to provide an improved clearing device whereby a glass such as a windshield or other window on an automobile or other conveyance may be kept clear from snow, ice, or the like. Another object of my invention is to provide an improved construction of this character especially adapted to cooperate with a glass cleaning device utilizing a hot air supply, my invention comprising improved means whereby the effectiveness of such a device is increased and whereby the effectiveness of the same is particularly improved in connection with open vehicles. Further objects of my invention include the provision of improved means of the character set forth which may be readily moved into or out of operative position on a glass, as for example a windshield, in such manner as to enable them to be very quickly put into or out of use when weather conditions change. These and other objects and advantages of my improved construction will, however, hereinafter appear.

In the accompanying drawings I have shown for purposes of illustration one embodiment which my invention may assume in practice, the same being illustrated as applied to an automobile windshield, though it will be understood that it may be applied to any other glass thereof and to other vehicles, such for example as airplanes.

In these drawings,—

Figure 1 is a perspective view of a portion of the automobile equipped with my improvement;

Fig. 2 is a partial vertical sectional view on line 2—2 of Fig. 1;

Fig. 3 is a similar view showing the connections to the heater nozzle;

Fig. 4 is a detail on line 4—4 of Fig. 2, and

Fig. 5 is a modified form of the construction shown in Fig. 2, especially adapted to use in connection with open vehicles, such as trucks or the like having no cab.

In this illustrative construction, I have shown an automobile, generally designated 1, and having a windshield 2 in front of its wheel 3, and this windshield equipped at a point opposite the driver's seat with my improved protective device, hereinafter described.

Referring more particularly to the construction shown in Figs. 1 to 4, it will be noted that I provide, inside the windshield 2 and spaced inwardly therefrom, a supplemental glass 4 of suitable conformation, herein of semi-circular shape, suitably attached to the car, herein at its upper end adjacent the upper edge of the windshield, and extending over a sufficient area to give the driver ample freedom of vision. Herein it will be noted that the upper edge of the glass 4 is suitably clamped at each end, as by a bolt and pad connection 5, to a U-shaped member 6 formed on a bracket 7. Each bracket 7 is in turn pivotally connected at 8 to a corresponding bracket or hinge member 9 adapted to be attached to the car by suitable means, herein by screws 10 to a portion 11 of the vehicle just above the windshield 2. Further, it will be noted that each of the brackets 7 has suitably formed thereon or attached thereto a cross connecting strip 12 adapted to space the glass 4 from the windshield 2 and further preferably to provide an air outlet at the top of the glass 4, suitable apertures 13 herein being provided in the member 12 for this latter purpose and providing outlet means causing an effective distribution of the air over the area desired. It will also be noted that I have provided clamping means adjacent each pivot 8 including a winged nut 14, so that whenever desired the glass 4 may be swung up at will about the pivot 8 of the bracket 7 and be held by these clamping means in an elevated position, shown for example in dotted lines in Fig. 2, wherein it is inoperative, or clamped by the same means in its operative position shown in full lines in Fig. 2.

In my improved construction the space between the windshield 2 and glass 4 is suitably heated in such manner as to keep the windshield 2 clear of frozen or other material obscuring the vision. These heating means may assume different forms. Herein, however, between the glass 4 and the windshield 2 and below the center of the area to be kept clear, is shown a suitable heater nozzle 16 of the general construction described in my co-pending application Serial No. 4,945, filed Jan. 26, 1925, now Patent No. 1,642,292, patented September 13, 1927, adapted to supply heated air from any suitable source, as for example atmospheric air suitably heated by the engine of the vehicle, and project it upwardly at an angle over the windshield 2 to heat the latter and thus keep the same clear during cold weather, storms, or the like. Thus it will be observed that, the effect of drafts behind the windshield being counteracted by the glass 4, the heated air flow is caused to increase its effectiveness as a clearing agent.

In my improved construction, means are also provided whereby the lower and side edges of the glass 4 are enclosed in such manner as to permit the heater to function even more effectively. Herein these enclosing means assume the form of suitable strips 17 of metal or rubber, or both, fitting over the edge of the glass 4 and abutting snugly against the adjacent surface of the windshield 2, the members 17 being suitably attached to the glass either by cement or by a suitable attaching means. Herein, as preferably, two members 17 are utilized, one on each side of the nozzle 16. Thus, it will be observed that the air supply furnished through the nozzle 16 is permitted to function entirely free from disturbance by air currents behind the windshield, as for example a back or side draft which might otherwise find its way between the glass 4 and the windshield, the maximum effectiveness of the heated air and the consequent clearing of a larger area being thus insured.

In my improved construction I also provide improved means for holding the nozzle 16 in position. Herein, it will be noted that the nozzle 16 carries a winged nut 18 threaded into the back of the same, as at 19, and that this member is extended through a pair of parallel strips 20 adapted to be disposed on opposite sides of the glass 4 between the members 17, suitable glass protecting means, as for example rubber pads 21, preferably also being disposed between the members 20 and the glass. Attention is also directed to the fact that a coiled spring 22 is disposed on the winged nut between the members 20. Thus it will be evident that by adjusting the member 18 it is possible to clamp the member 16 to the bottom of the glass 4 and between the members 17 very quickly and readily and hold the member 16 securely in position. Further, it will be evident that by releasing the member 18 the member 16 may be dropped out of operative position so that if desired it may be used as a heater in the bottom of the car, the glass 4 then ordinarily also being swung up into the dotted line position shown in Fig. 2.

In Fig. 5 I have illustrated a modified construction which is essentially the same as that previously described, with the exception that, instead of a bracket 9, a bracket 23 is provided having a slotted edge 24 adapted to be extended over the upper edge of the windshield 2 and clamped thereto by a suitable setscrew 25. This construction is especially adapted to use in connection with open vehicles, as for example trucks having no cab, and is obviously adapted to be very quickly and readily applied thereto.

In the use of my invention it will be evident that the heated air supplied from the nozzle 16 will be so confined and directed as to enable it to have maximum effectiveness in heating the windshield and keeping ice or the like from forming thereon, or melting any already formed, so that any ordinary outside windshield wiper, shown herein at 26 in Fig. 1, can keep the windshield clear. More specifically, the provision of the separate glass tends to reduce the effect of drafts calculated to interfere with the proper supply of heat, and the provision of the enclosing means for the edge of the glass further reduces such drafts. It will also be evident that as a result of my invention these protective means may be quickly rendered operative or inoperative. For example, with the parts on the vehicle when the weather is clear but cold, the glass 4 may be swung up into its inoperative position, in which it is entirely out of the way, and the nozzle 16 used as a heater in the bottom of the car. When, however, weather conditions are bad, it is only necessary to swing the glass 4 down into position and attach the nozzle 16 thereto in order to meet those conditions. In warm weather, the whole device may be removed if desired, it only being necessary to remove the screws 10 and pull out the nozzle connections to do this. Ordinarily, however, when there is a heater on the engine, this is also removed in the spring.

Attention is also directed to the unidirectional flow of heated air through the clearing device in a vertical path and to the concentration of the same upon the area to be kept clear, the arrangement being such that in even the most extreme weather a sufficiently large area is kept clear to permit the operator to see the road. More particularly, it will be noted that the supply of the heated air is such as, while utilizing it at a maximum temperature and concentrating it upon the area acted upon by the wiper, to cause it to be distributed over this operating zone of the wiper and thereby insure maximum effectiveness of the latter, the nozzle acting to distribute the air, and the shape of the enclosure cooperating with the improved outlet means to maintain this wiper zone at such a temperature as to enable it to be kept clear under even the most adverse conditions.

It will further be evident that by the provision of my improved mechanism it is made possible to eliminate, if desired, a swivel support for the nozzle pipe such as described in my co-pending application mentioned above, the attachment of the nozzle to the glass 4 as in this construction making any other support for the nozzle unnecessary. Also, any desired sort of flexible pipe may be used. It will also be evident that if desired the nozzle may be extended from the heater under the hood out under the instrument board without the necessity for a special construction of the instrument board and with a consequent reduction in cost and increase in standard character of the vehicle, enabling the invention to be applied more readily to any vehicle with a minimum of change therein. These and other advantages of my improvement will, however, be clearly apparent to those skilled in the art.

While I have in this application specifically described one embodiment which my invention may assume in practice, it will be understood that the same is shown for illustrative purposes only and that the invention may be modified and embodied in various other forms without departing from its spirit or the scope of the appended claims.

What I claim as new and desire to secure by Letters Patent is:

1. In combination, an outer glass carrying a pivoted outside wiper, an inside glass spaced from said glass and substantially co-existent with the area wiped by said wiper, and means for maintaining a circulation of heated air in one direction from the bottom to the top between said glasses over the area wiped by said wiper.

2. In combination, an outer glass carrying a pivoted outside wiper, an inside glass spaced from said glass, and means for keeping clear the area wiped by said wiper including an enclosing frame between said glasses substantially co-incident with the lower edge of the area wiped by said wiper, a distributing nozzle delivering between said glasses and through said frame and distributing heated air over said area, and top outlet means for the heated air.

3. In a glass clearing device for conveyances, a supplementary inside glass of substantially semi-circular shape, and means for heating the space between the same and the glass to be kept clear having a heat inlet at the rounded bottom thereof, an outlet along the straight top thereof, and enclosing means adjacent the bottom edge thereof for preventing the entry of drafts between the glasses.

In testimony whereof I affix my signature.

ALBERT WILLIAM BECKER.